(12) United States Patent
Lim et al.

(10) Patent No.: US 9,604,624 B2
(45) Date of Patent: Mar. 28, 2017

(54) METHOD FOR CONTROLLING FOUR WHEEL DRIVING OF VEHICLE

(71) Applicants: Hyundai Motor Company, Seoul (KR); Hyundai Wia Corporation, Changwon-si (KR)

(72) Inventors: Sung Keun Lim, Anyang-si (KR); Ji Soo Lee, Yongin-si (KR); Heon Kang, Hwaseong-si (KR)

(73) Assignees: Hyundai Motor Company, Seoul (KR); Hyundai Wia Corporation, Changwon-si (KR)

(*) Notice: Subject to any disclaimer, the term of this patent is extended or adjusted under 35 U.S.C. 154(b) by 243 days.

(21) Appl. No.: 14/328,438

(22) Filed: Jul. 10, 2014

(65) Prior Publication Data
US 2015/0149064 A1  May 28, 2015

(30) Foreign Application Priority Data
Nov. 26, 2013  (KR) .................. 10-2013-0144445

(51) Int. Cl.
*B60W 10/06* (2006.01)
*B60W 10/119* (2012.01)
(Continued)

(52) U.S. Cl.
CPC ....... *B60W 10/119* (2013.01); *B60K 23/0808* (2013.01); *B60K 2023/0858* (2013.01);
(Continued)

(58) Field of Classification Search
CPC ...... B60W 10/06; B60W 10/18; B60W 30/16; B60W 40/02; F02D 28/00; B60L 11/14; B60K 6/04
(Continued)

(56) References Cited

U.S. PATENT DOCUMENTS 6,249,735 B1 * 6/2001 Yamada ............... B60T 8/18
701/65
8,078,348 B2 * 12/2011 Saitoh ................ B60L 11/1887
180/65.1
(Continued)

FOREIGN PATENT DOCUMENTS

JP     2007-237828 A    9/2007
KR    1020080021336 A   3/2008
(Continued)

*Primary Examiner* — Tan Q Nguyen
(74) *Attorney, Agent, or Firm* — Morgan, Lewis & Bockius LLP

(57) ABSTRACT

A method of controlling traveling of a vehicle may include a measuring step that measures a longitudinal acceleration sensing value by a longitudinal acceleration sensor on a vehicle, a longitudinal acceleration calculating step that calculates a longitudinal acceleration of the vehicle from a speed of the vehicle, a slope degree calculating step that calculates a slope degree of a ground on which the vehicle is, from the longitudinal acceleration sensing value and the calculated longitudinal acceleration, a determining step that determines a slope direction and a slope level of the ground from the calculated slope degree, and a controlling step that provides in advance a torque amount, which is distributed from main driving wheels to sub-driving wheels for traveling, to a power distribution device, at different levels in accordance with the slope direction and the slope level of the ground.

11 Claims, 5 Drawing Sheets

(51) Int. Cl.
*B60K 23/08* (2006.01)
*B60K 6/00* (2006.01)

(52) U.S. Cl.
CPC ... *B60W 2520/105* (2013.01); *B60W 2520/28* (2013.01); *B60W 2550/142* (2013.01)

(58) Field of Classification Search
USPC .......................... 701/69, 65, 51, 48; 180/197
See application file for complete search history.

(56) References Cited

U.S. PATENT DOCUMENTS

| | | | |
|---|---|---|---|
| 2003/0060961 A1* | 3/2003 | Ishizu | B60W 10/06 701/93 |
| 2004/0249542 A1* | 12/2004 | Murasugi | F16H 61/0213 701/51 |
| 2005/0165549 A1* | 7/2005 | Schneider | B60K 28/16 701/69 |
| 2007/0129871 A1* | 6/2007 | Post, II | B60K 23/0808 701/69 |
| 2010/0017070 A1* | 1/2010 | Doering | B60W 30/04 701/48 |

FOREIGN PATENT DOCUMENTS

| | | |
|---|---|---|
| KR | 2020120060104 A | 6/2012 |
| KR | 10-2012-0107675 A | 10/2012 |
| KR | 10-1243075 B1 | 3/2013 |
| KR | 1020130059202 A | 6/2013 |
| KR | 10-1294065 B1 | 8/2013 |

\* cited by examiner

*FIG. 4*

| Variable | first level | second level | third level | fourth level | fifth level |
|---|---|---|---|---|---|
| slope degree | steep downhill slope | smooth downhill slope | flatland | smooth uphill slope | steep uphill slope |
| free torque | 2 ~100Nm | 2 ~100Nm | 2 ~100Nm | 2 ~200Nm | 200 ~400Nm |
| torque removal ratio | 0 | 0 | 0 | 20~40% | 40~80% |

METHOD FOR CONTROLLING FOUR WHEEL DRIVING OF VEHICLE

CROSS-REFERENCE TO RELATED APPLICATION

The present application claims priority of Korean Patent Application Number 10-2013-0144445 filed on Nov. 26, 2013, the entire contents of which application are incorporated herein for all purposes by this reference.

BACKGROUND OF INVENTION

Field of Invention

The present invention relates to a method of controlling four-wheel driving of a vehicle, and more particularly, to a method of controlling four-wheel driving of a vehicle which improves an uphill-driving response speed and uphill-driving ability, when a vehicle starts, particularly, on an uphill, by controlling first the driving force of the rear wheels of a four-wheel drive vehicle in accordance with a degree of slope of a ground on which the vehicle is.

Description of Related Art

In general, in four-wheel drive vehicles, which simultaneously drive the front wheels and the rear wheels, using a transfer case that distributes driving torque from an engine to the front wheels and the rear wheels, the driving force is distributed to the tires of the front and rear wheels, when the vehicles are driven on a slippery road such as a snowy road or an icy road or need large driving force, for example, on a sandy ground, a steep slope, and a muddy road, so the driving tires less slip on the roads, and thus stability in traveling and the ability of running on the grounds are improved.

The four-wheel drive vehicles require a control unit that appropriately distributes the driving force from the engine to the front wheels and the rear wheels, depending on the surrounding environment, and increases/decreases the driving torque by determining which driving wheels are given too much driving force on the basis of the difference in number of revolutions of the front and rear wheels.

FIG. 1 is a diagram illustrating the configuration of a common four-wheel drive vehicle in a normal state, in which a transfer of the four-wheel drive vehicle, in a normal state, appropriately distributes the driving force from an engine 1 to the front wheels and the rear wheels, depending on the surrounding environment of the vehicle that is traveling.

The transfer 40 is connected to a controller 30 and distributes the driving force to the front and rear wheels and the controller 30 determines whether the vehicle slips on the basis of the rotation speeds of the wheels 20a, 20b, 20c, and 20d and controls the transfer 40 distributing the driving force to the front and rear wheels.

However, in the four-wheel drive vehicles, when the vehicles start after stopping on a slope, more loads are applied to the rear wheels than the front wheels, so the friction force between the front wheels and the ground relatively decreases, whereas the friction force between the rear wheels and the ground increases.

Therefore, there is a problem in that when front wheels are rotated by relatively large driving torque, the driving force of the front wheels is larger than the friction force, so the front wheels further slip while the driving force of the rear wheels relatively decreases and the force that pushes the vehicle by the rear wheels relatively decreases, so the ability of starting and uphill-driving of the vehicle decreases.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method of controlling a four-wheel driving of a vehicle which improves an uphill-driving response speed and uphill-driving ability, when a vehicle starts, particularly, on an uphill, by controlling first the driving force of the rear wheels of a four-wheel drive vehicle in accordance with the degree of slope of the ground on which the vehicle is.

Various aspects of the present invention provide a method of controlling four-wheel driving of a vehicle, which may include a measuring step that measures a longitudinal acceleration sensing value by a longitudinal acceleration sensor on a vehicle, a longitudinal acceleration calculating step that calculates a longitudinal acceleration of the vehicle from a speed of the vehicle, a slope degree calculating step that calculates a slope degree of a ground on which the vehicle is, from the longitudinal acceleration sensing value and the calculated longitudinal acceleration, a determining step that determines a slope direction and a slope level of the ground from the calculated slope degree, and a controlling step that provides in advance a torque amount, which is distributed from main driving wheels to sub-driving wheels for traveling, to a power distribution device, at different levels in accordance with the slope direction and the slope level of the ground.

In the longitudinal acceleration calculating step, the longitudinal acceleration may be calculated by differentiating an average wheel speed. In the longitudinal acceleration calculating step, noise may be removed by a noise filter, after the longitudinal acceleration is calculated.

The main driving wheels may be front wheels and the sub-driving wheels may be rear wheels, and the torque amount provided when the vehicle is on a ground with an uphill slope may be larger than those when the vehicle is on a ground with a downhill slope or on a flatland.

In the controlling step, the higher the slope level of the uphill slope, the larger the torque amount may be provided. The controlling step may further include a removal controlling step that maintains or reduces the torque amount provided to the power distribution device in accordance with a brake signal-maintaining time or a shift gear-maintaining time of the vehicle.

In the removal controlling step, when the brake signal-maintaining time is less than a first reference time, the provided torque amount may be maintained. In the removal controlling step, when the brake signal-maintaining time is equal to or more than a first reference time and less than a second reference time, the provided torque amount may be reduced by a predetermined ratio on an uphill slope. In the removal controlling step, the higher the slope level of the uphill slope, the larger ratio the torque amount may be reduced by. In the removal controlling step, when the brake signal-maintaining time is equal to or more than the second reference time, the provided torque amount may be fully removed.

In the removal controlling step, when the P-shift gear or the N-shift gear is engaged and the shift gear-maintaining time is less than a third reference time, the provided torque amount may be maintained. When the P-shift gear or the N-shift gear is engaged and the shift gear-maintaining time is equal to or more than a third reference, the provided torque amount may be completely removed.

According to the present invention, since the degree of a slope that a vehicle is on is determined in advance from the difference between the sensing value and the longitudinal acceleration and an appropriate amount of torque is provided in advance to the power distribution device in accordance with the level of the slope degree, the response speed in starting of the vehicle is improved, and particularly, on an uphill slope, relatively larger driving force is provided in advance to the rear wheels through the power distribution device, so the uphill-driving response speed and the uphill-driving ability are improved.

Further, since driver's intention for stopping is determined and the torque amount provided with recognition of a slope is maintained and removed, it is possible to prevent frequent conversion between recognition of a slope and stop. In addition, since the torque amount is reduced by a predetermined ratio when the logic for recognizing a slope is stopped, the torque amount is prevented from being rapidly reduced and shock in the four-wheel drive system can be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 4 is a diagram showing examples of a torque amount removal ratio and a torque amount provided in advance in accordance with the level of the degree of the slope determined by an exemplary method of the present invention.

Figure 1:
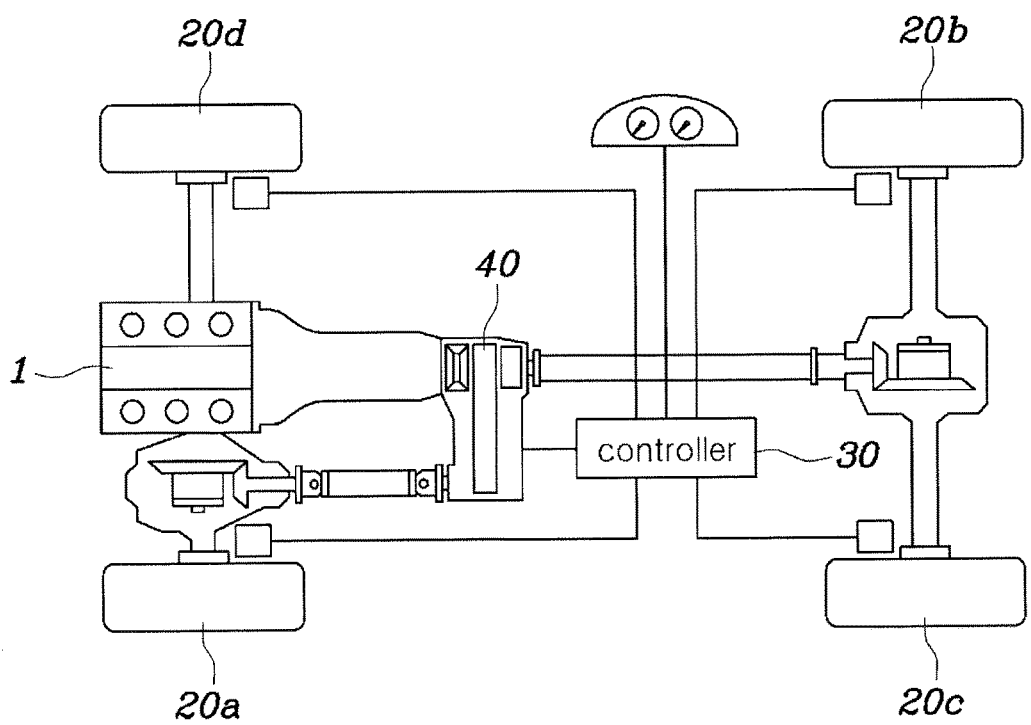
FIG. 1 is a diagram schematically showing the configuration of a four-wheel drive system of the related art in a normal state.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
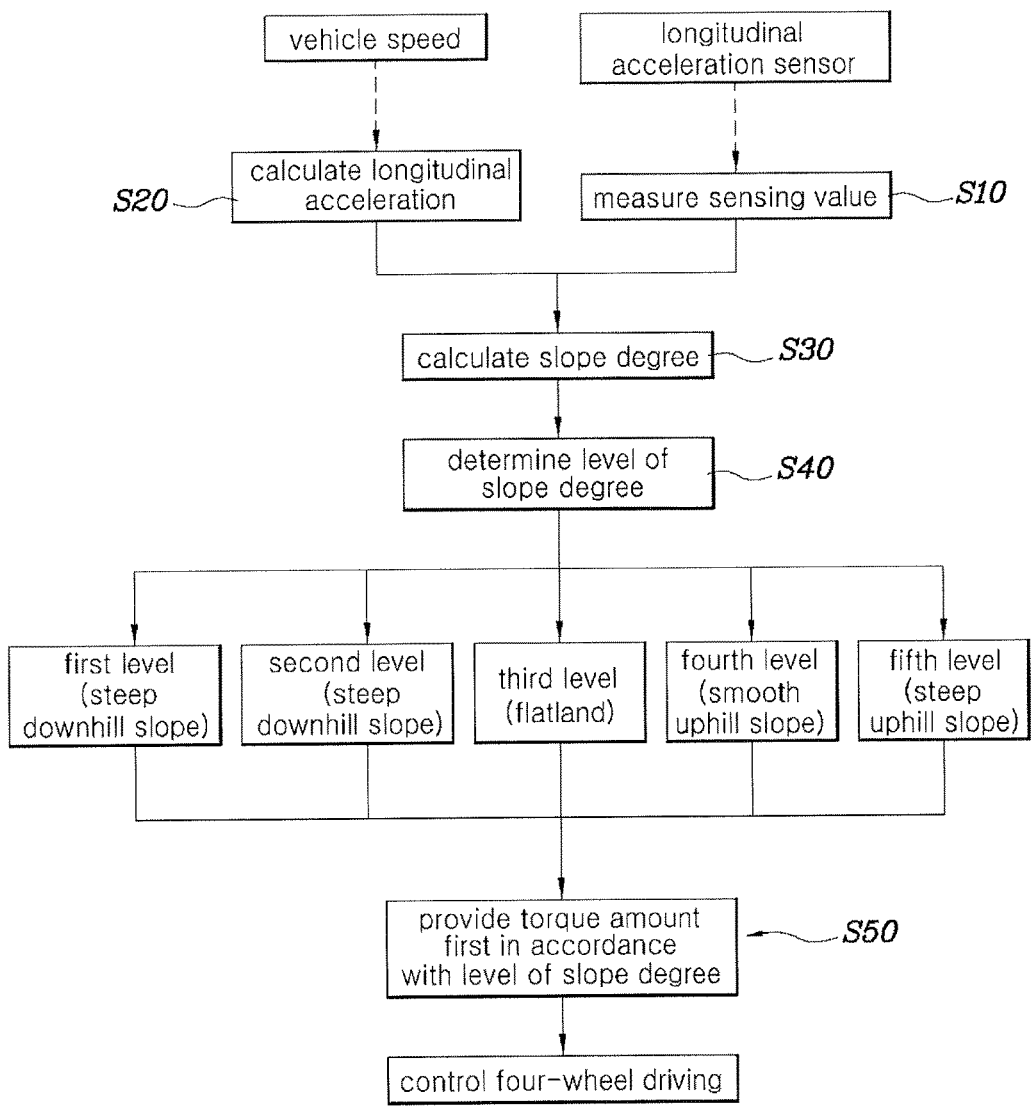
FIG. 2 is a flowchart illustrating a control flow of controlling the torque amount by determining the degree of a slope using an exemplary method of controlling four-wheel driving for a vehicle according to the present invention.
Figure 3:
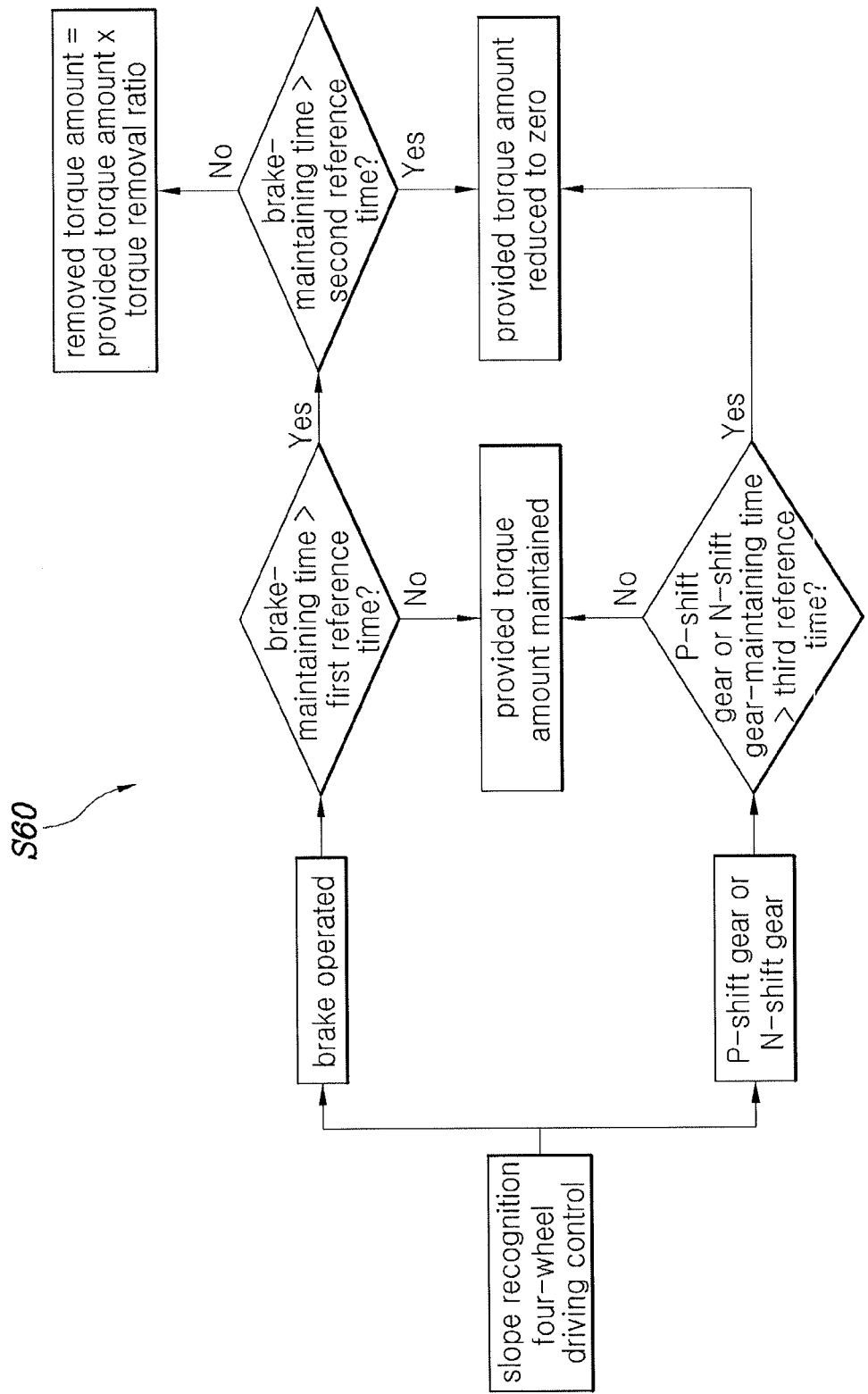
FIG. 3 is a flowchart illustrating a control flow of removing the torque amount according to an exemplary method of controlling four-wheel driving of the present invention.
Figure 5:
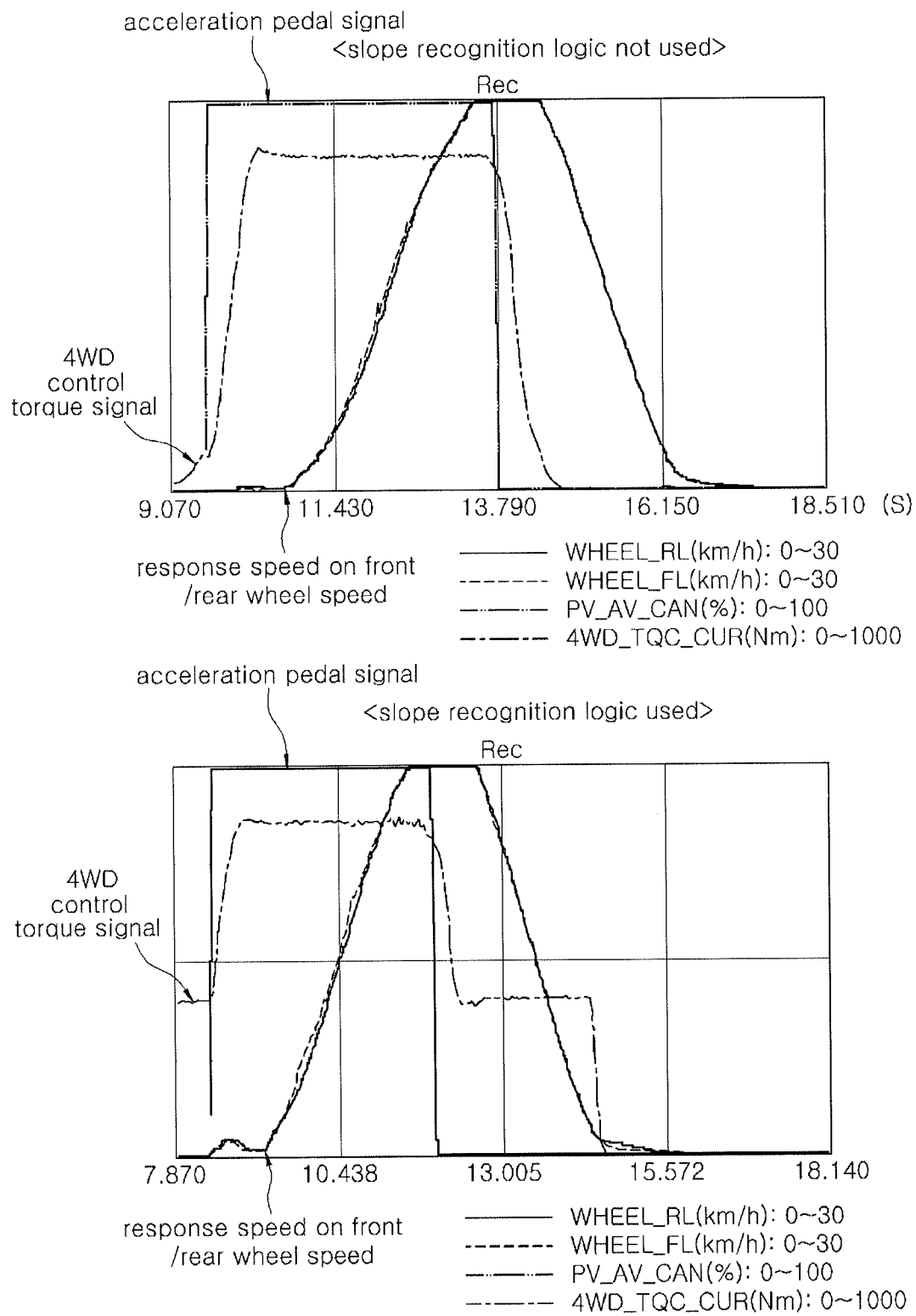
FIG. 5 is a test result showing differences in torque amounts in starting a vehicle, when an exemplary method of controlling four-wheel driving of the present invention is applied versus when not applied.

FIG. 2 is a flowchart illustrating a control flow of controlling the torque amount by determining the degree of slope according to a method of controlling four-wheel driving for a vehicle according to the present invention, FIG. 3 is a flowchart illustrating a control flow of removing the torque amount according to the method of controlling four-wheel driving of the present invention, FIG. 4 is a diagram showing examples of a torque amount removal ratio and a torque amount provided in advance in accordance with the level of the degree of the slope determined by a method of the present invention, and FIG. 5 is a test result showing differences in torque amounts in starting a vehicle, when a method of controlling four-wheel driving of the present invention is applied versus when not applied.

The method of controlling four-wheel driving of a vehicle of the present invention includes a measuring step S10, a longitudinal acceleration calculating step S20, a slope degree calculating step S30, a determining step S40, and a controlling step S50.

Describing the present invention in detail with reference to FIGS. 2 and 3, the method includes: the measuring step S10 that measures a longitudinal acceleration sensing value by a longitudinal acceleration sensor on a vehicle; the longitudinal acceleration calculating step S20 that calculates the longitudinal acceleration of the vehicle from the vehicle speed; the slope degree calculating step S30 that calculates the slope degree of the ground on which the vehicle is, from the longitudinal acceleration sensing value and the actual longitudinal acceleration; the determining step S40 that determines the slope direction and the slope level of the ground from the calculated slope degree; and the controlling step S50 that provides in advance the torque amount, which is distributed from the main driving wheels to the sub-driving wheels for traveling, to a power distribution device, at different levels in accordance with the slope direction and the slope level of the ground.

The method determines in advance the slope degree of the ground on which the vehicle is from the difference between the sensing value and the longitudinal acceleration and provides in advance appropriate torque amount to the power distribution device in accordance with the level of the slope degree, thereby improving the response speed for starting of a vehicle. The power distribution device may be a transfer case and the transfer case may be equipped with a multiplate clutch that can distribute power to the front wheels and the rear wheels.

In the longitudinal acceleration calculating step S20 of the present invention, the longitudinal acceleration can be calculated by differentiating the average wheel speed. Further, in the longitudinal acceleration calculating step S20, it is possible to remove noise, using a noise filter, after calculating the longitudinal acceleration. The noise filter may be a low pass filter. The longitudinal acceleration with noise removed may be calculated using the following equation:

Longitudinal acceleration with noise removed=Low pass filter (LP)(d(Average wheel speed/dt)

Describing in detail the method of calculating the slope degree, the longitudinal acceleration sensor on the vehicle may be a DC accelerometer, and the slope is measured as 0 on a flatland and the slope of 90° is measured as 1 g. In the output from the longitudinal acceleration sensor, the acceleration value according to acceleration/deceleration motion of the vehicle is included in the value according to the level of the slope degree.

The acceleration value according to acceleration/deceleration motion of the vehicle is longitudinal acceleration obtained by differentiating the wheel speed.

Accordingly, by subtracting the longitudinal acceleration value calculated by differentiating the wheel speed from the longitudinal acceleration sensing value, it is possible to extract the rear slope degree value of the ground on which the vehicle is regardless of the current traveling state of the vehicle, as in the following equation:

Slope degree (%)=tan [sin$^{-1}${Longitudinal acceleration sensing value (m/s$^2$)−Calculated longitudinal acceleration value (m/s$^2$)/g}]×100

Accordingly, the slope on which the vehicle is traveling is exactly or accurately determined quickly, for example, within 1 to 2 seconds by the slope degree calculating step S30, so it is possible to improve the response speed in starting of the vehicle.

In the present invention, the main driving wheels may be the front wheels and the sub-driving wheels may be the rear wheels.

In the controlling step S50, when the ground that the vehicle is on is determined as an uphill slope in the determining step S40, the torque amount larger than that for a downhill slope and a flatland can be provided. Preferably, in some embodiments, in the controlling step S50, the higher the slope level of the uphill slope, the larger the torque amount can be provided to the power distribution device.

The magnitude of the torque amount provided in accordance with the slope level may be set by a mapped value and the steps of the slope level may be set in various magnitudes. As an example, referring to FIG. 4, when the slope level of the calculated slope degree corresponds to a steep downhill slope, a smooth downhill slope, and a first level, a second level, and a third level, which are flatlands, the torque amount of 2~100 Nm can be provided in advance to the power distribution device.

Further, when the slope level of the calculated slope degree corresponds to a fourth level, which is a smooth uphill slope, the torque amount of 2~200 Nm can be provided in advance to the power distribution device, and particularly, when the slope level corresponds to a steep uphill slope, the torque amount of 200~400 Nm larger than that for a smooth uphill slope can be provided in advance to the power distribution device.

That is, when a vehicle starts after stopping, larger loads are applied to the rear wheels than the front wheel particularly on an uphill slope, so high torque should be provided to the rear wheels to drive them.

Accordingly, since the slope degree is determined in advance and, as in the test result at the right side in FIG. 5, the torque amount is provided in advance to the power distribution device to correspond to the slope level and the driving force of the front wheels is controlled to be distributed in advance to the rear wheels, the uphill response speed on operation of the acceleration pedal is improved.

In particular, on an uphill slope, as the torque amount distributed to the rear wheels relatively increases, the driving force of the rear wheels increases against the loads and friction force on the rear wheels, so the force pushing the vehicle increases and the uphill-driving ability is improved.

The controlling step S50 may further include a removal controlling step S60 that maintains or reduces the torque amount provided to the power distribution device in accordance with a brake signal-maintaining time or a specific shift gear-maintaining time of the vehicle. That is, the removable controlling step determines the point of time for stopping a slope recognition logic by determining the driver's intention for stopping the vehicle with the slope recognition logic operated, and frequent conversion between recognition and non-recognition of a slope is prevented.

Referring to FIG. 3, in the removal controlling step S60, the provided torque amount can be maintained, when the brake signal-maintaining time is less than a first reference time. The first reference time may be set such as at 3 seconds. That is, when the brake signal-maintaining time is within 3 seconds, it is determined that there is no driver's intention for stopping, so the logic according to recognition of a slope is maintained without the provided torque amount reduced.

In the removal controlling step S60, when the brake signal-maintaining time is the first reference time or more and less than a second reference time, the provided torque amount can be reduced by a predetermined ratio on an uphill slope. The second reference time may be set such as at 6 seconds.

The higher the slope level of the uphill slope, the larger ratio the torque amount can be reduced by. That is, for example, when the brake signal-maintaining time is 4 seconds and the slope level of the current road corresponds to the fourth level that is a smooth uphill slope, the torque amount provided to the power distribution device may be reduced such as by a ratio of 20~40%. When the slope level of the current road corresponds to the fifth level that is a steep uphill slope, the torque amount may be reduced such as by a ratio of 40~80%, larger than that for the smooth uphill slope.

That is, with the slope recognition logic operated, when the recognition logic is suddenly stopped, shock is applied to the inside of the four-wheel drive system, so generation of shock is minimized by reducing the torque by a predetermined ratio, as described above, and frequent conversion between operation and stop of the slope recognition logic is prevented.

Further, in the removal controlling step S60, when the brake signal-maintaining time is the second reference time or more, the provided torque amount is fully reduced. That is, when the brake signal-maintaining time is, for example, 6 seconds or more, it is determined that there is driver's intention for stopping, so the torque provided in advance due to recognition of a slope is removed.

In the removal controlling step S60, when the P-shift gear or the N-shift gear is engaged and the shift gear-maintaining time is less than a third reference time, the provided torque amount may be maintained. The third reference time may be set such as at 3 seconds.

That is, when the P-gear or the N-gear-maintaining time is within 3 seconds, it is determined that there is no driver's intention for stopping, so the logic according to recognition of a slope is maintained without the provided torque amount reduced.

Further, when the P-shift gear or the N-shift gear is engaged and the shift gear-maintaining time is the third reference time or more, the provided torque amount can be fully reduced. That is, when the P-gear or the N-gear-maintaining time is 3 seconds or more, it is determined that there is driver's intention for stopping, so the torque provided first due to recognition of a slope is removed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling traveling of a vehicle, comprising:
   a measuring step that measures a longitudinal acceleration sensing value by a longitudinal acceleration sensor on the vehicle;
   a longitudinal acceleration calculating step that calculates a longitudinal acceleration of the vehicle from a speed of the vehicle;
   a slope degree calculating step that calculates a slope degree of a ground on which the vehicle is, from the longitudinal acceleration sensing value and the calculated longitudinal acceleration;
   a determining step that determines a slope direction and a slope level of the ground from the calculated slope degree; and
   a controlling step that provides in advance a torque amount, which is distributed from main driving wheels to sub-driving wheels for traveling, to a power distribution device, at different levels in accordance with the slope direction and the slope level of the ground; and
   a removal controlling step that maintains or reduces the torque amount provided to the power distribution device in accordance with a brake signal-maintaining time or a shift gear-maintaining time of the vehicle.

2. The method of claim 1, wherein in the longitudinal acceleration calculating step, the longitudinal acceleration is calculated by differentiating an average wheel speed.

3. The method of claim 2, wherein in the longitudinal acceleration calculating step, noise is removed by a noise filter, after the longitudinal acceleration is calculated.

4. The method of claim 1, wherein the main driving wheels are front wheels and the sub-driving wheels are rear wheels, and
   the torque amount provided when the vehicle is on a ground with an uphill slope is larger than those when the vehicle is on a ground with a downhill slope or on a flatland.

5. The method of claim 4, wherein in the controlling step, the higher the slope level of the uphill slope, the larger the torque amount is provided.

6. The method of claim 1, wherein in the removal controlling step, when the brake signal-maintaining time is less than a first reference time, the provided torque amount is maintained.

7. The method of claim 1, wherein in the removal controlling step, when the brake signal-maintaining time is equal to or more than a first reference time and less than a second reference time, the provided torque amount is reduced by a predetermined ratio on the uphill slope.

8. The method of claim 7, wherein in the controlling step, the higher the slope level of the uphill slope, the larger ratio the torque amount is reduced by.

9. The method of claim 1, wherein in the removal controlling step, when the brake signal-maintaining time is equal to or more than the second reference time, the provided torque amount is fully removed.

10. The method of claim 1, wherein in the removal controlling step, when a P-shift gear or an N-shift gear is engaged and the shift gear-maintaining time is less than a third reference time, the provided torque amount is maintained.

11. The method of claim 1, wherein when the P-shift gear or the N-shift gear is engaged and the shift gear-maintaining time is equal to or more than a third reference, the provided torque amount is fully removed.

* * * * *